Oct. 8, 1946. W. H. SMITH 2,408,958
BEARING SERVICING EQUIPMENT
Filed June 12, 1944
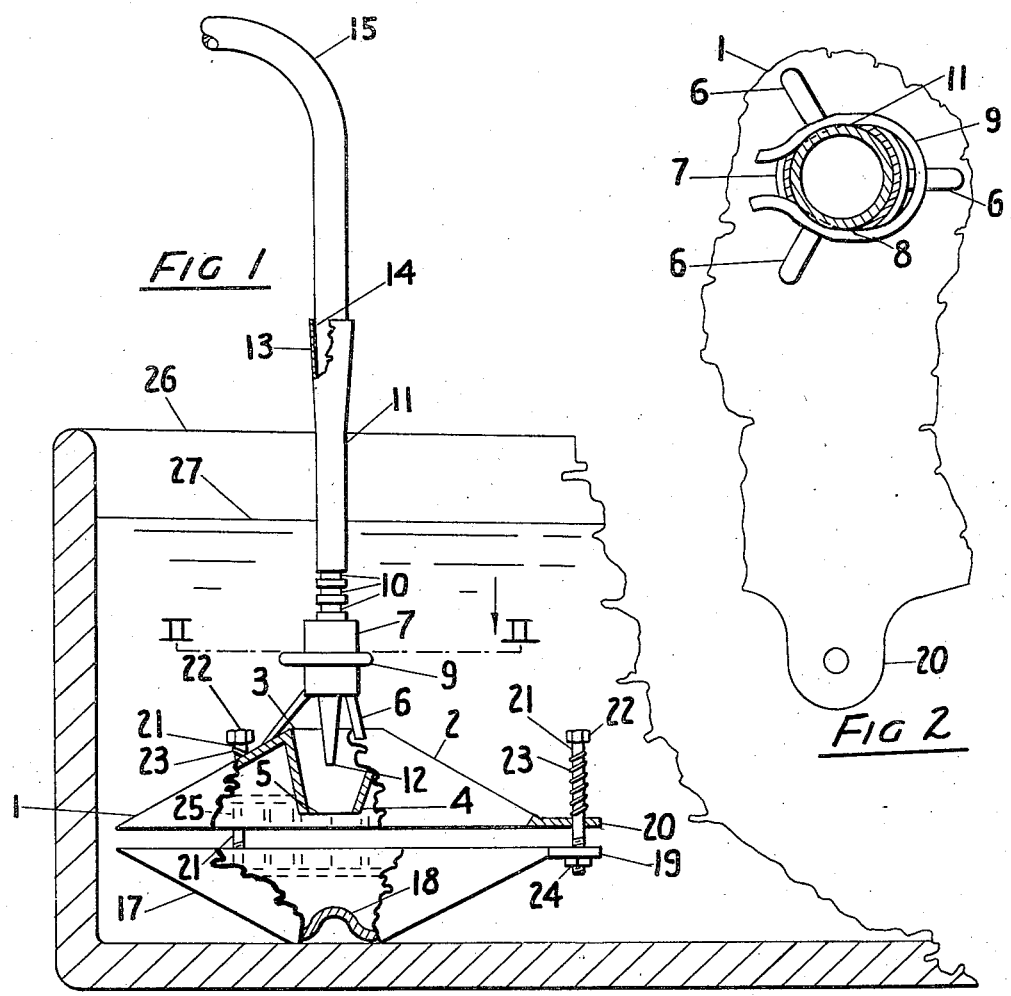
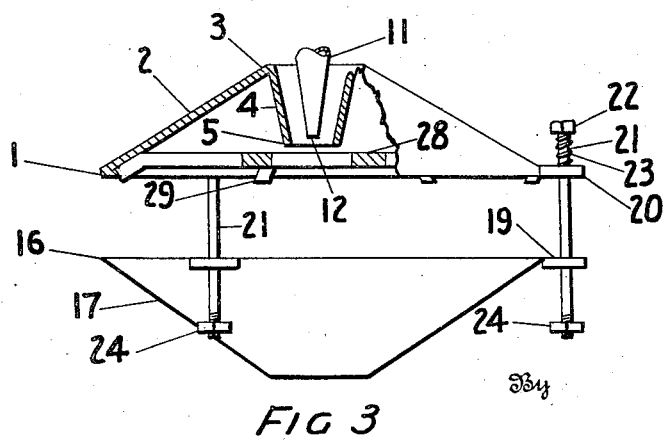
Inventor
William H. Smith Patented Oct. 8, 1946

2,408,958

UNITED STATES PATENT OFFICE 2,408,958

BEARING SERVICING EQUIPMENT

William H. Smith, Evanston, Ill.

Application June 12, 1944, Serial No. 539,849

3 Claims. (Cl. 134—94)

This invention relates to up-keep equipment, more particularly for anti-friction bearings of the annular or ring type, whether lateral or thrust, balls, cylinder of various types, or tapered, but usually as endless units.

This invention has utility in the cleaning of foreign matter from a new bearing; grit, dirt, heavy or spent lubricant from a used bearing; and even drying, coating for storage as against corrosion, as well as replenishing lubricant therefor.

Referring to the drawings:

Fig. 1 is a side elevation, with parts broken away, of an embodiment of the invention, as submerged in use for a circulation treatment, as cleaning or washing;

Fig. 2 is a section on the line II—II, Fig. 1, looking in the direction of the arrow, and showing detail of the quick-adjustable feature for varying the nozzle injector action position, and thereby changing the volume of liquid flow per unit of time; and Fig. 3 is a partial view of the unit, in spread position for receiving thereinto or for removal therefrom, of an article to have the washing or other treatment attention.

An upper or main member 1 of the unit of the invention embodiment, has an upwardly inwardly tapering or conical section 2 to a top concentric opening 3 from which depends a more steep reverse taper section 4 to a central downwardly directed discharge outlet or nozzle 5. Rising from about the opening 3 are legs 6 to concentrically mount a sleeve 7 above the aligned openings 3, 5. The sleeve 7 has slot portions forming a seat 8 for a U-shaped spring clip 9, as a quick adjustment to have snap operation thru the seat 8. The seat 8 is an arc slot thru the sleeve 7. Therethru, the legs of the clip 9 may enter to engage ring groove 10 of tubular member 11 thereby to adjust the extent of entrance of its lower nozzle 12 in the section 4. Adjustment is achieved by withdrawing the clip 9 from the engaging groove 10 of the member 11, and even clear of the sleeve 7. There is thus release for changing the telescopic relation between the member 11 and the sleeve 7. In making this change, another groove 10 is brought into registry with the seat opening means 8 of the sleeve 7, and the clip 9 then thrust about the sleeve 7 to have its spring legs ride into the seat 8 to engage this other groove 10. The adjusted re-assembly is now completed.

The upper terminus of this concentrically mounted tubular member 11, has a tapered seat 13 into which may be thrust for frictional anchorage therewith, a tapered discharge nozzle 14 of an air hose 15, connected up to a source of compressed air supply. For ready service attention for blowing and clearing work objects, a supply of blowing fluid, which may even be steam, may be available in a factory, shop, or garage conducting general attention to machine parts or manufacture. The pressure and available volume of such supply may vary.

A second or complementary member 16 has a reverse tapered or conical portion 17 narrowing away from the member 1. At the lower less diameter portion of the conical portion 17, there is a reverse or dome 18, concentric with the blowing nozzle 12 and its injector acting liquid flushing opening 5.

The member 16 from its major diameter portion has eyes 19 adapted to align with eyes 20 from the upper member 1. In these pairs of eyes are bolts 21 with heads 22 to hold compression helical springs 23, to thrust the members 1, 16, toward each other to the limit permitted by adjustable nuts 24 at the opposite ends of the respective bolts 21. With no item or work between the members 1, 16, the eyes 20 abut. The holding action of the springs 23 may be resisted for the insertion of an item of work, as an anti-friction bearing 25. The complementary conical portions 2, 17, serve automatically to center the bearing 25 as to the opening 5 and the dome 18. The assembled unit may then be lowered into a tank 26 to be submerged in a liquid 27, of an oil, solvent, water, or such as may be required for the attention to be given to the item of work. Either before, or after, this lowering or submerging, by the member 11 as a handle, the fluid blast connection hose 15 may be connected.

The operation is such that the flow thru the member 11 having discharge at its nozzle 12, acts as an injector below the surface of the liquid 27. The liquid 27 is circulated, by being drawn into the opening 3 due to the clearance provided by the legs 6 in spacing the sleeve 7 upward. The drawn-in liquid is impelled at considerable current velocity from the opening 5 to strike the dome 18 and there be spread for outward and upward flow as directed by the conical section 17. This rising flow is directly toward the bearing 25. The escape for this flowing stream is only in the clearance or spacing between the members 1, 16, as determined by the bearing 25 therebetween. Inasmuch as the bearing 25 is interposed, the current flow is between the anti-friction elements and their assembly or mounting means. By regulating the extent of entrance of the nozzle 12 into the taper section 4, and by varying the fluid supply pressure, there is possible a wide range of current flow control. The entrance position for the nozzle 12 is quickly reset thru the medium of the spring clip 9 in its changed holding relation with a groove 10 of the member 11. It is to be noted that the liquid 27, spilling from between the members 1, 16, into the pool of the tank 26, is available for re-circulation by being drawn into the opening 3. A minimum portion of the liquid may even be recirculated between the member 1, 16, for the rising liquid not escaping thru the bearing 25 and the clearance between members 1, 16, may rise and be directed by the conical portion 2 to reenter the downflow course.

Primarily the tapered portions 2, 17, may be in the range of 27° to 30° for taking care of a wide range of work units. In the event an item of work has its outer portion effective as a closure between the portions 2, 17, a ring 28 with radiating fingers 29, spaces such bearing from the portion 2 for fluid flow escape between the fingers 29 and outward from thence between the members 1, 16.

What is claimed and it is desired to secure by Letters Patent is:

1. For a bearing washer, a submersible holder comprising a pair of relatively axially shiftable complementally-tapered seat-providing members adapted to center a bearing therebetween with the bearing effective to hold the members spaced to provide a spill opening outwardly therefrom, a container providing a pool of liquid in which the members may hold the bearing, and an injector-acting fluid supply connection to the holder adapted to deliver fluid into the liquid inwardly of the bearing, and to recirculate spill from the opening through the holder.

2. A bearing washer comprising a tapered seat-providing first member having an axial intake opening, an opposing seat-providing oppositely tapered member having a deflector dome centrally thereof and opposite the intake opening of the first member, said members together forming a holder for a bearing therebetween with its axis in the direction between the intake opening and dome, there being peripheral clearance between the members about the bearing, and fluid supply blast means having a nozzle directed into and clear of the intake opening for effecting liquid circulation thru the bearing upon submergence of the holder.

3. A bearing washer comprising a centering seat-providing member to position in a liquid a bearing held thereby, a guide to the member, said member having an opening, and an air blast nozzle mounted by the guide at the opening, there being a spill-way from the washer remote from the opening and nozzle, the nozzle being adjustable to vary injector action clearance at the opening, there being clearance thru said spill-way for nozzle impelled liquid flow thru a bearing centered by the member.

WM. H. SMITH.